United States Patent [19]

Shurtleff et al.

[11] Patent Number: 5,275,734
[45] Date of Patent: Jan. 4, 1994

[54] CHEMICAL PRE-TREATMENT AND BIOLOGICAL DESTRUCTION OF PROPYLENE CARBONATE WASTE STREAMS EFFLUENT STREAMS TO REDUCE THE BIOLOGICAL OXYGEN DEMAND THEREOF

[75] Inventors: James A. Shurtleff, Endwell; Kevin P. Unger, Endicott, both of N.Y.

[73] Assignee: International Business Machines Corporation, Armonk, N.Y.

[21] Appl. No.: 924,740

[22] Filed: Aug. 4, 1992

[51] Int. Cl.$^5$ ............................................. C02F 3/12
[52] U.S. Cl. ............................. 210/626; 210/631; 210/908; 210/749
[58] Field of Search ............ 210/620, 631, 626, 908, 210/910, 749; 549/230

[56] References Cited

U.S. PATENT DOCUMENTS

| | | | |
|---|---|---|---|
| 3,926,796 | 12/1975 | Fujita et al. | 210/626 |
| 4,760,014 | 7/1988 | Wong | 210/723 |
| 4,786,417 | 11/1988 | Miki et al. | 210/639 |
| 5,112,491 | 5/1992 | Strantz, Jr. | 210/651 |
| 5,182,029 | 1/1993 | Erb | 210/724 |

FOREIGN PATENT DOCUMENTS 50-4850  1/1975  Japan .

Primary Examiner—Stanley S. Silverman
Assistant Examiner—Cynthia L. Nessler
Attorney, Agent, or Firm—Richard M. Goldman

[57] ABSTRACT

Disclosed is a method of treating a process stream from a process producing a non-biodegradable alkylene carbonate stream. The alkylene carbonate is hydrolyzed in a strong, aqueous, alkaline solution to form an aqueous alkaline solution of the corresponding alkylene glycol. This solution is then acidified to a pH of about 8 to 8.5. The acidified solution is aerated in activated sludge to reduce the biological oxugen demand (BOD) of the solution.

9 Claims, 1 Drawing Sheet

CHEMICAL PRE-TREATMENT AND BIOLOGICAL DESTRUCTION OF PROPYLENE CARBONATE WASTE STREAMS EFFLUENT STREAMS TO REDUCE THE BIOLOGICAL OXYGEN DEMAND THEREOF

CROSS REFERENCE TO RELATED APPLICATIONS

This application is related to the following commonly assigned, copending U.S. Patent Applications:

1. U.S. application Ser. No. 07/781,542, filed Oct. 22, 1991, of N. R. Bantu, Anilkumar Bhatt, Ashwinkumar Bhatt, G. W. Jones, J. A. Kotylo, R. J. Owen, K. I. Papathomas, and A. K. Vardya for Photoresist Develop and Strip Solvents and Methods for their Use.

2. U.S. application of Gary S. Ksenak for Organic Emission Scrubbing Abatement for Propylene Carbonate, (Ser. No. 07/924 769).

3. U.S. application of J. J. Wagner, A. C. Bhatt, R. N. Bantu, R. W. Keesler, T. D. Sinclair, and K. I. Papathomas for Propylene Carbonate Recovery Process. (Ser. No. 07/925 349).

FIELD OF THE INVENTION

The invention described herein relates to the destruction of environmentally compatible developers and stripping solvents for photoresist materials. Specifically, the invention relates to the conversion of the effluent streams containing spent cyclic alkylene carbonate developers and stripping solvents to environmentally manageable end-products. Cyclic alkylene carbonates, as propylene carbonate, are useful as a substitute in photolithographic processes for such chlorinated solvents as Methyl Chloroform (MCF; 1,1,1-Trichloroethane) and Methylene Chloride (MC; Dichloromethane). Impure liquid compositions of alkylene carbonates, as propylene carbonate, and photoresist and/or solder mask material are recovered from circuit panel manufacturing processes. The cyclic alkylene carbonate solvents are removed from developed and/or circuitized boards by mechanical processes, such as abrasion, squeezing, air knives, or the like. The circuitized boards are then rinsed off, either with tap water or deionized water, or low boiling solvents, forming an effluent stream. According to the invention described herein the effluent stream, an impure liquid product of the manufacturing process, is treated to hydrolyze the relatively non-biodegradable alkylene carbonate, for example, propylene carbonate, to a relatively biodegradable intermediate, for example, an alkylene glycol, such as propylene glycol, which can then be biodegraded.

BACKGROUND OF THE INVENTION

The alkylene carbonate effluents treated by the method of the invention are produced as the effluents of photolithographic processes. More specifically, they are impure alklyene carbonate solution, laden with both dissolved and suspended photoresist, and with other impurities.

Photolithographic processes in packaging are described in *Microelectronics Packaging Handbook*, Pub. Van Nostrand Reinhold, New York, 1989, Tummala et al, eds. on pages 898-903, in *Principles of Electronic Packaging*, McGraw-Hill Book Company, New York, 1989, Seraphim et al, eds. in Chapter 12, pages 372-393 and in Scientific Encyclopedia, 6th Ed., Vol. II, Pub. Van Nostrand Reinhold Company, New York, 1983, Considine et al, eds., pages 1877-1881, all of which are incorporated herein by reference for use as background.

Photolithography plays a critical role in the art of printed circuit packaging. Photolithography is used to define in a thin film of photoresist those regions either from which copper is to be selectively etched to subtractively form circuitization, or selectively plated to additively form circuitization.

There are two types of photoresist: negative and positive. A negative photoresist is polymerized by exposure, e.g., selective exposure to the particular actinic radiation to which it is sensitive for an adequate period of time. It is then subjected to its developer. The developer solubilizes the areas of the resist which have not been exposed to actinic radiation. The areas of negative photoresist which have been exposed to actinic radiation are hardened by cross-linking and made more resistant to developer, relative to the unexposed regions.

Positive acting resists behave oppositely. Actinic radiation renders the positive acting photoresist more soluble in the developer, and the exposed regions are removed preferentially by a dilute alkaline developer.

Positive acting photoresists are used extensively to fabricate silicon devices, and for subtractive circuitization of printed circuit boards. However, positive photoresists, which are readily developed by dilute aqueous alkaline solutions and stripped by more concentrated aqueous alkaline solutions, perform poorly in high caustic environments and high temperatures.

The negative resists, on the other hand, are used when the circuit lines are provided by additive plating of copper, in areas where copper is desired, i.e., electroless or electroless plus electroplating, rather than by etching of copper away from where it is not desired.

Negative acting photoresists are cross-linked by the action of actinic energy on photoactive agents that form the free radicals or ionic groups necessary to initiate and/or support polymerization. Depending on their composition, commercially available photoresists are sensitive to UV radiation, X-rays, E-beams and so forth. The radiation may be furnished to the resist through a pattern in a mask, such as an emulsion mask or chrome mask, by contact or projection, or a beam of radiation may be rastered.

Negative acting photoresists include an organic resin binder, a photoinitiator/photosensitizer and a reactive monomer. Optionally, negative acting photo-resists also include fillers, for example, organic or inorganic fillers, fire retardants, plasticizers, dyes, flexibilizers, thermal stabilizers and other additives to improve the processing characteristics of the package.

Typical negative photoresist compositions include from 40 to 70% by weight of binder, 10 to 40% by weight of monomer, and 0.5 to 15% by weight of photoinitiator, to total 100% based on the weight of all these components.

An example of such compositions is described in U.S. Pat. No. 4,326,010. (example 1).

In general negative-working resists are photopolymerizable materials of the type described in U.S. Pat. No. 3,469,982, U.S. Pat. No. 4,273,857 and U.S. Pat. No. 4,293,635 and the photocrosslinkable species of the type disclosed in U.S. Pat. No. 3,526,504.

Monomers which can be used either alone or in combination with others to form negative acting photoresists include: t-butyl acrylate, 1,5 pentanediol diacrylate, N,N-diethylaminoethyl acrylate, ethylene glycol diacrylate, 1,4-butanediol diacrylate, diethylene glycol diacrylate, hexamethylene glycol diacrylate, 1,3-propanediol diacrylate, decamethylene glycol diacrylate, decamethylene glycol dimethacrylate, 1,4-cyclohexanediol diacrylate, 2,2-dimethylolpropane diacrylate, glycerol diacrylate, tripropylene glycol diacrylate, glycerol triacrylate, trimethylolpropane triacrylate, pentaerythritol triacrylate, polyoxyethylated trimethylolpropane triacrylate and trimethacrylate and similar compounds as disclosed in U.S. Pat. No. 3,380,831, 2,2-di-(p-hydroxyphenyl)-propane diacrylate, pentaerythritol tetraacrylate, 2,2-di(p-hydrohyphenyl)-propane dimethacrylate, triethylene glycol diacrylate, polyoxyethyl-2,2-di-(p-hydroxyphenyl)-propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of tetrachloro-bisphenol-A, di-(2-methacryloxyethyl) ether of tetrachloro-bisphenol-A, di-(3-methacryloxy-2-hydroxypropyl) ether of tetrabromo-bisphenol-A, di-(2-methacryloxyethyl) ether of tetrabromo-bisphenol-A, di-(3-methacryloxy-2-hydroxypropyl) ether of 1,4-butanediol, di-(3-methacryloxy-2-hydroxypropyl) ether of diphenolic acid, triethylene glycol dimethacrylate, polyoxypropyltrimethylol propane triacrylate, ethylene glycol dimethacrylate, butylene glycol dimethacrylate, 1,3-propanediol dimethacrylate, 1,2,4-butanetriol trimethacrylate, 2,2,4-trimethyl-1,3-pentanediol dimethacrylate, pentaerythritol trimethacrylate, 1-phenyl ethylene-1,2-dimethacrylate, pentaerythritol tetramethacrylate, trimethylol propane trimethacrylate, 1,5-pentanediol dimethacrylate, diallyl fumarate, styrene, 1,4-benzenediol dimethacrylate, 1,4-diisopropenyl benzene, and 1,3,5-triisopropenyl benzene.

In addition to the monomers mentioned above, the photoresist material can also contain one or more free radical-initiated and polymerizable species with molecular weight of at least about 300. Monomers of this type are an alkylene or a polyalkylene glycol diacrylate and those described in U.S. Pat. No. 2,927,022.

Free radical initiators which can be activated by actinic radiation which are thermally inactive at and below 185 degrees Centigrade include the substituted or unsubstituted polynuclear quinones listed in the following: 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrequinone, 1,2-benzanthraquinone, 2,3-benzanthraquinone, 2-methyl-1,4-naphthone, 2,3-dichloronaphthoquinone, 1,4-dimethylanthraquinone, 2,3-dimethylanthraquinone, 2-phenylanthraquinone, 2,3-diphenylanthraquinone, 2,3-diphenylanthraquinone, sodium salt of anthraquinone alphasulfonic acid, 3-chloro-2-methylanthraquinone, retenequinone, 7,8,9,10-tetrahydronaphthacenequinone, and 1,2,3,4-tetrahydrobenz(a)anthracene-7,12-dione.

Other useful photoinitiators, of which some may be thermally active at temperatures lower than 85 degrees C., are described in U.S. Pat. No. 2,760,863.

Dyes of a photoreducible nature and other reducing agents are described in U.S. Pat. Nos. 2,850,445; 2,875,047; 3,097,096; 3,074,974; 3,097,097; and 3,145,104 as well as dyes of the phenazine, oxazine and quinone classes; Micheler's ketone, benzophenone, 2,4,5-triphenylimidazolyl dimers with hydrogen donors, and mixtures thereof as described in U.S. Pat. Nos. 3,427,161; 3,479,185 and 3,549,367 can be used as initiators. The cyclohexadienone compounds of U.S. Pat. No. 4,341,860 are also useful as initiators. In addition sensitizers described in U.S. Pat. No. 4,162,162 in combination with photoinitiators and photoinhibitors are useful.

Polymeric binders which can be used alone, or in combination with polymerizable monomers include the following: polyacrylate and alpha-alkyl polyacrylate esters, i.e. polymethyl methacrylate and polyethyl methacrylate; polyvinyl esters: i.e. polyvinyl acetate, polyvinyl acetate/acrylate, polyvinyl acetate/methacrylate and hydrolyzed polyvinyl acetate; ethylene/vinyl acetate copolymers; polystyrene polymers and copolymers, i.e. with maleic anhydride and esters; vinylidene chloride copolymers, i.e. vinylidene chloride/acrylonitrile; vinylidene chloride/methacrylate and vinylidene chloride/vinyl acetate copolymers; polyvinyl chloride and copolymers, i.e. polyvinyl chloride/acetate; saturated and unsaturated polyurethanes; synthetic rubbers, i.e. butadiene/acrylonitrile, acrylonitrile/butadiene/styrene, methacrylate/acrylonitrile/butadiene/styrene copolymers, 2-chlorobutadiene-1,3 polymers, chlorinated rubber, and styrene/butadiene/styrene, styrene/isoprene/styrene block copolymers; high molecular weight polyethylene oxides of polyglycols having average molecular weight from about 4,000 to 1,000,000; epoxides, i.e. containing acrylate or methacrylate groups; copolyesters; nylons or polyamides, i.e. N-methoxymethyl, polyhexamethylene adipamide; cellulose esters, i.e. cellulose acetate succinate and cellulose acetate butyrate; cellulose ethers, i.e. methyl cellulose, ethyl cellulose and benzyl cellulose; polycarbonates; polyvinyl acetal, i.e. polyvinyl butyral, polyvinyl formal; polyformaldehydes.

In addition to the polymeric binders listed above particulate thickeners such as described in U.S. Pat. No. 3,754,920 i.e. silicas, clays, alumina, bentonites, kaolnites, and the like can be used.

Where aqueous developing of the photoresist is desirable the binder should contain sufficient acidic or other functionalities to render the composition processable in the aqueous developer. Suitable aqueous-processable binders include those described in U.S. Pat. No. 3,458,311 and in U.S. Pat. No. 4,273,856. Polymers derived from an aminoalkyl acrylate or methacrylate, acidic film-forming comonomer and an alkyl or hydroxyalkyl acrylate such as those described in U.S. Pat. No. 4,293,635 can be included.

Normally a thermal polymerization inhibitor will be present to increase the stability during storage of the photosensitive compositions. Such inhibitors are; p-methoxyphenol, hydroquinone, alkyl and aryl-substituted hydroqinones and quinones, tert-butyl catechol, pyrogallol, copper resinate, naphthylamines, beta-napthol, cuprous chloride, 2,6-di-tert-butyl-p-cresol, phenothiazine, pyridine, nitrobenzene and dinitrobenzene, p-toluequinone and chloranil. Also useful for thermal polymerization inhibitors are the nitroso compositions described in U.S. Pat. No. 4,168,982.

Dyes and pigments may also be added to increase the visibility of the resist image. Any colorant used however, should be transparent to the actinic radiation used.

An example of such photosensitive compositions is described in Table I of U.S. Pat. No. 4,693,959.

In the preparation of these formulations generally inert solvents are employed which are volatile at ordinary pressures. Examples include alcohols and ether alcohols, esters, aromatics, ketones, chlorinated hydrocarbons, aliphatic hydrocarbons, miscellaneous solvents such as dimethylsulfoxide, pyridine, tetrahydrofuran, dioxane, dicyanocyclobutane and 1-methyl-2-oxo-hexamethyleneimine, and mixtures of these solvents in various proportions as may be required to attain solutions. Antiblocking agents to prevent the coatings from adhering to the supporting files can also be included.

With some polymers, it is desirable to add a plasticizer, either solid or liquid, to give flexibility to the film or coating. Suitable plasticizers are described in U.S. Pat. No. 3,658,543. A preferred liquid plasticizer is nolylphenoxypoly(ethyleneoxy)-ethanol. A preferred solid plasticizer is N-ethyl-p-toluenesulfonamide.

Photoimagable compositions are also utilized as solder masks. In such application a photoimagable composition is used by applying the composition to printed circuit board and followed by photolithographic techniques to expose various underlying features on the board while masking others. During the soldering process the solder will deposit onto the exposed underlying components. It is necessary that the solder mask material be formulated such that it can be applied by the appropriate methods, for example curtain coating. Suitable photoimageable compositions including many that use epoxies are described in the following U.S. Pat. Nos. 4,279,985; 4,458,890; 4,351,708; 4,138,255; 4,069,055; 4,250,053; 4,058,401; 4,659,649; 4,544,623; 4,684,671; 4,624,912; 4,175,963; 4,081,276; 4,693,961; and 4,442,197.

More recently an improved cationically photoimageable solder mask is described in U.S. Pat. No. 5,026,624 assigned to the assignee of the present application, disclosure of which is incorporated herein by reference. In fact U.S. Pat. No. 5,026,624 teaches an improved photoimageable cationically polymerizable epoxy based coating material.

In processing negative working resists, unexposed areas of the imaged film are typically removed from the surface of a printed circuit board or substrate by action of a liquid developer in a spray form for a duration of several minutes or less. Depending on the particular type of photoresist composition the liquid developer may be a simple organic solvent, an aqueous solution of an inorganic base, or as described in U.S. Pat. No. 3,475,171, a combination of organic solvent and aqueous base to form a semi-aqueous developer.

Methyl chloroform (MCF, 1,1,1-trichloroethane), and methylene chloride (MC, dichloromethane) are solvents which are widely used in the electronic packaging art and in other arts for developing and removing a number of photoresists which are otherwise resistant to chemical attack.

The highly alkaline electroless copper plating baths used in additive processes provide a harsh environment for photoresist. In general, the more chemically impervious resists are removable in an organic solvent such as methylene chloride. For less demanding chemical environments, aqueous developable photoresists may be adequate. The organically developable resists, however, continue to be used in an electroless copper environment and in the print band and thin film technologies in conjunction with acrylate-based resist such as DuPont's Riston T-168 and solvent processed solder masks such as the DuPont Vacrel 700 and 900 series, environments in which the aqueous resists are vulnerable.

The use of 1,1,1-trichloroethane and methylene chloride is disfavored because of growing environmental concerns over the effect of gaseous halogenated hydrocarbons on the depletion of earth's ozone layer and concerns over introducing suspected carcinogens to the atmosphere. Several countries have set goals for their total elimination. However, there continue to be many manufacturing processes in which use of resists which are aqueously developable simply is not feasible.

The industry therefore continues the search for organic solvents as alternates to 1,1,1-trichloroethane and methylene chloride. The new solvents must meet specific manufacturing and environmental requirements with respect to flammability, toxicity, ability to effect dissolution, shelf-life, waste disposal, ability to recycle, simplicity of composition, and compatability with a spectrum of resists.

Alternative solvents for stripping solvent based Riston photoresists are also described in Research Disclosures, June 1989, p. 302, published anonymously.

There have been previous attempts reported in the art to provide environmentally friendly alternatives to 1,1,1-trichloroethane and methylene chloride. However, none of the references describe the simple, environmentally acceptable, room temperature developer and stripper of the present invention.

The commonly assigned, copending U.S. application Ser. No. 07/781 542, filed Oct. 22, 1991, of N. R. Bantu, Anilkumar Bhatt, Ashwindumar Bhatt, G. W. Jones, J. A. Kotylo, R. J. Owen, K. I. Papathomas, and A. K. Vardya for Photoresist Develop And Strip Solvents and Methods for their Use, describes the use of 4-methyl -1,2- dioxolan -2-one (propylene carbonate, methyl ethylene carbonate, 1,2-propylene carbonate) as a developer and and as a stripping agent. This material has the structure:

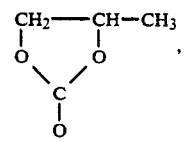

Bantu et al describe its use as an alternative to halogenated hydrocarbon developers and strippers for use in developing and stripping acrylate based photoresist such as DuPont Riston T-168 and polymethyl methacrylate, and solvent processed solder masks such as the Vacrel 700 and 900 series.

U.S. application Ser. No. 07/781 542 describes developing the radiation-exposed resist in a high boiling solvent selected from the group consisting of propylene carbonate (PC), gamma butyrolactone (BLO) and benzyl alcohol (BA). The process occurs at about 24 to 45 degrees Centigrade for about 0.5–12 minutes and is normally followed by a warm or cold, deionized or tap water rinse, or alternatively, a low boiling solvent rinse, to remove excess developer.

The solvents of U.S. application Ser. No. 07/781 542 are high boiling solvents, while the common developers of the prior art for developing Riston type photoresists are low boiling solvents. The use of low boiling solvents such as methyl chloroform (MCF), methyl ethyl ketone (MEK), xylenes or mixtures thereof are similar to the methylene chloride stripping process.

By way of contrast high boiling solvents, i.e. n-methyl pyrolidone (NMP), gamma-butyrolactone (BLO), dimethyl sulfoxide (DMSO) and propylene carbonate (PC) must be followed by a rinsing step with compatible solvent or water. Furthermore, in order to obtain dissolution times comparable to those of MC, it is necessary that temperature during stripping be maintained between about 50 degrees Centigrade and 100 degrees Centigrade. However, these requirements add to the expense and difficulty of economically managing the alkylene carbonate effluent, which is non-biodegradable.

Thus, there is a clear need for a low cost process for the management of alkylene carbonate waste streams, for example, propylene carbonate waste streams.

OBJECTS OF THE INVENTION

It is a primary object of the invention to provide a simple, low cost process to manage dilute, impure cyclic alkylene carbonate waste streams.

It is a further object of the invention to convert the non-biodegradable, dilute, impure, cyclic alkylene carbonate waste streams to a biodegradable intermediate.

It is a still further object of the invention to reduce the biological oxygen demand (BOD) of the alkylene carbonate waste streams.

SUMMARY OF THE INVENTION

The method of the invention provides a simple, low cost process to manage alkylene carbonate waste streams, and convert the non-biodegradable alkylene carbonate waste streams to a biodegradable intermediate, while reducing the biological oxygen demand (BOD) of the alkylene carbonate waste streams.

The invention provides a method of treating an effluent stream from a process, for example, a photolithographic process, that produces a non-biodegradable alkylene carbonate stream. The alkylene carbonate is hydrolyzed in a strong, aqueous, alkaline solution to form an aqueous alkaline solution of the corresponding alkylene glycol. Typically, the alkylene carbonate is hydrolyzed in an aqueous alkaline solution, such as an aqueous alkali metal hydroxide, at a alkaline pH above 12 to form the aqueous alkaline solution of the corresponding alkylene glycol.

The resulting alkylene glycol solution is then acidified to a pH of about 8 to 8.5. This is carried out by contacting the alkylene solution with a dilute acid, as dilute sulfuric acid, to acidify the aqueous alkaline alkylene glycol solution to a pH of about 8 to 8.5.

The acidified solution is aerated in activated sludge to reduce the biological oxygen demand (BOD) of the solution. In this step the acidified aqueous alkylene glycol is aerated long enough to reduce the biological oxygen demand by at least about 95%. This is typically about 48 hours.

According to a preferred embodiment of the invention the alkylene carbonate is propylene carbonate and the corresponding alkylene glycol is propylene glycol. While the invention is described and illustrated with respect to propylene carbonate,

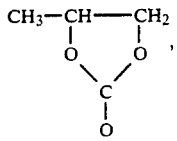

it is, of course, to be understood, that higher homologs of propylene carbonate, such as

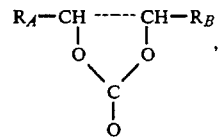

where at least one and preferably both of $R_A$ and $R_B$ are short chain alkyl groups, and one of $R_A$ and $R_B$ may be —H, may be used. Exemplary short chain alkyl groups are $CH_3$—$(CH_2)_n$—, where n in $R_A$ and $R_B$ are independent integers from 0 to 3.

THE FIGURES

The invention may be understood by reference to the FIGURES.

DETAILED DESCRIPTION OF THE INVENTION

Impure propylene carbonate is an effluent from an upstream industrial process in which relatively pure propylene carbonate is used as either a developing agent or a stripping agent, or as both, in the removal of a thin film, layer, or coating of a polymeric material. The impure propylene carbonate contains both solubilized polymer and dispersed solid polymer. In one embodiment of the invention the polymer is a photoresist, for example, a negative photoresist formed of acrylic acid and acrylate ester moieties, such as Dupont Riston, and the effluent is the effluent of either or both of the developing and stripping steps. The polymer, whether solubilized or dispersed, is referred to herein as "solids."

Figure 1:
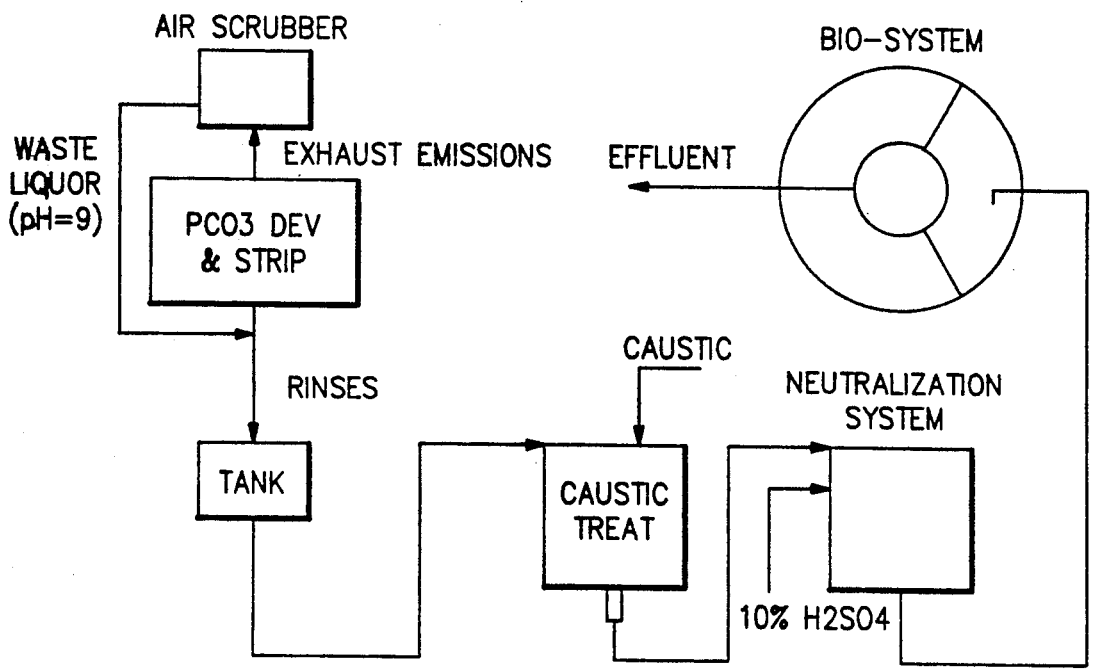
FIG. 1 is a flow chart of the process of the invention.
Figure 2:
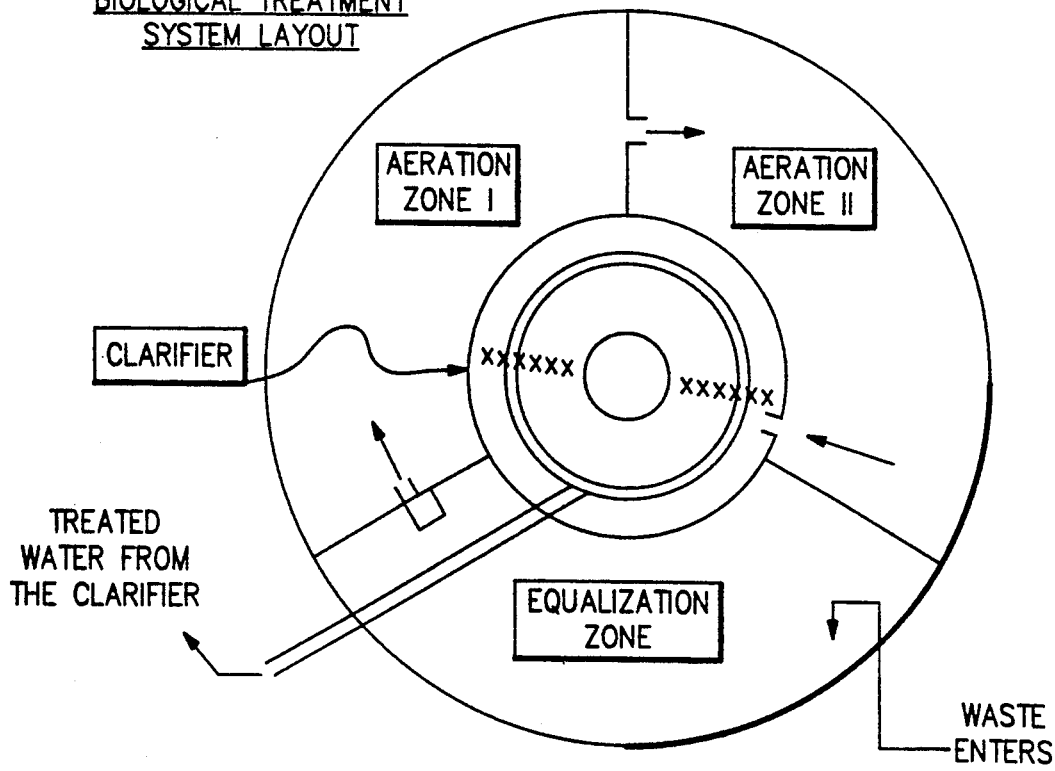
FIG. 2 is a schematic view of the aeration system.

The major constituent of the effluent is a cyclic alkylene carbonate, as propylene carbonate. Cyclic alkylene carbonates are not easily biodegradable, and when they degrade, they do so with a high Biological Oxygen Demand (BOD). According to the invention, and as shown in the flow chart of FIG. 1, a high BOD alkylene carbonate waste stream 11 is converted to a biodegradable, reduced BOD alkylene glycol intermediate 31.

The alkylene carbonate 11 is hydrolyzed in a strong, aqueous, alkaline solution 21 to form an aqueous alkaline solution of the corresponding alkylene glycol 31. Typically, the alkylene carbonate 11 is hydrolyzed in an aqueous alkali metal hydroxide, at a alkaline pH above 12, to form the aqueous alkaline solution 31 of the corresponding alkylene glycol.

The resulting alkylene glycol solution 31 is then acidified to a pH of about 8 to 8.5. This is carried out by contacting the alkaline alklyene glycol solution 31 with a dilute acid 41, as dilute sulfuric acid, to acidfy the aqueous alkaline alkylene glycol solution 31 to a pH of about 8 to 8.5.

The acidified solution 51 formed thereby is aerated in activated sludge 61 to reduce the biological oxygen demand (BOD) of the solution. In this step the acidified aqueous alkylene glycol is aerated long enough to reduce the biological oxygen demand by at least about 95%. This is typically about 48 hours.

While the invention is described and illustrated with respect to propylene carbonate,

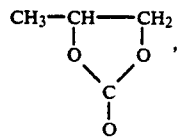

it is, of course, to be understood, that higher homologs of propylene carbonate, such as

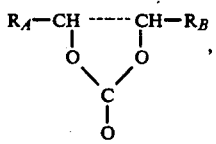

where one of $R_A$ and $R_B$ may be —H, and one or both of $R_A$ and $R_B$ are short chain alkyl groups, may be used. Exemplary short chain alkyl groups are $CH_3$—$(CH_2)_n$—, where n in $R_A$ and $R_B$ are independent integers from 0 to 3. It is, of course, further to be understood, that the vapor pressure of the cyclic alkylene carbonate must be high enough to allow fractionation or separation.

In the embodiment of the invention where the polymer is an acrylic-acrylate type photoresist, the photolithographic process 1 gives rise to both gaseous 2 and liquid 3 streams.

In the embodiment of the invention where the polymer is an acrylic-acrylate type photoresist and the solvent is propylene carbonate, the effluent of the photolithographic process contains (i) above about 50 weight percent propylene carbonate, and generally from about 96 weight percent to about 99 weight percent of propylene carbonate, (ii) up to about 40 weight percent photoresist materials, and generally from about 0.2 weight percent to about 1.0 weight percent of "photoresist materials," i.e., "solids," that is, both dispersed solid polymer and dissolved, solubilized polymer, (iii) up to about 5 weight percent, and generally from about 0.1 weight percent to about 0.5 weight percent of propylene glycol, a hydrolysis decomposition product of propylene carbonate, and (iv) up to about 5 weight percent, and generally from about 0.1 weight percent to about 2.5 weight percent of water. These weight percentages should total 100 weight percent, but may total less than 100 weight percent if other impurities are present.

The gaseous effluent 2 arises because of the use of brushing and temperatures above about 50 degrees Centigrade, and generally from about 50 degrees Centigrade to about 100 degrees Centigrade in the photolithographic process. These relatively high temperatures introduce the necessity of dealing with gaseous alkylene carbonate 2, e.g., propylene carbonate, at least at the hundreds to thousands of parts per million level.

The gaseous alkylene carbonate 2, as propylene carbonate, is scrubbed in air scrubber 5 by first removing the cyclic alkylene carbonate bearing gas, 2 e.g., the propylene carbonate bearing gas, as air, from the photolithographic process 1, and passing the alkylene carbonate, e.g., propylene carbonate, bearing gas 2 through an aqueous alkaline liquid in an air scrubber 5 to scrub the propylene carbonate from the gas. The scrubbed air, substantially free of airborne alkylene carbonate vapors, e.g., propylene carbonate vapors, is recovered from the process.

Both (i) scrubbed air substantially free of alkylene carbonates, as propylene carbonate, and (ii) an alkaline liquor 7 containing the residue of the scrubbed gaseous propylene carbonate are recovered. The scrubbing liquor 7 and the liquid effluent 3 of the photolithographic process 1 are collected, e.g., in a holding tank or mixing tank 13.

In the first step of the two stage method of the invention, the alkylene carbonate, 11, i.e., propylene carbonate, is hydrolyzed to alkylene carbonate, i.e., propylene carbonate and carbon dioxide in the presence of an alkali metal hydroxide and water, according to the reaction

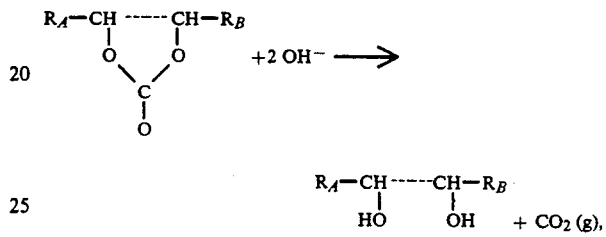

where $R_A$ and $R_B$ are as defined above. This reaction is carried out in a caustic treatment tank 21.

The alkaline material may be an alkali metal hydroxide, or an alkali metal salt of a weak acid. Exemplary alkali metals are potassium and sodium. The anionic component may be hydroxide or an anion of a weak acid, as acetate, carbonate, bicarbonate, or the like.

Conversion of the alkylene carbonate to the alkylene glycol enhances biodegradability, as the glycol is more biodegradable then the carbonate. The aqueous, alkaline solution of a alkylene glycol 31 is then neutralized to a pH that is acceptable for treatment with activated sludge. This is a pH of about 8.0 to 8.5. Neutralization is carried out by adding a dilute acid 43, as dilute sulfuric acid, to the alkaline, alkylene glycol solution. The dilute acid 43 may be 10 weight percent sulfuric acid.

Biological destruction is then carried out in an activated sludge extended aeration biological treatment system 61. The mean residence time in the activated sludge extended aeration biological treatment system 61 is long enough to obtain the desired reduction in BOD (Biologic Oxygen Demand) of the alkylene glycol.

The activated sludge extended aeration biological treatment system 61 utilizes an activated sludge of microorganisms capable of aerobically stabilizing, i.e., destroying, the alklyene glycol. With an inlet liquor BOD loading of about 800, and a BOD reduction of at least about 95%, the residence time is at least about 48 hours.

Thus, according to the method of the invention, there is provided a simple, low cost process to manage alkylene carbonate waste streams, and convert the non-biodegradable alkylene carbonate waste streams to a biodegradable intermediate, while reducing the biological oxygen demand (BOD) of the alklyene carbonate waste streams.

While the invention has been described with respect to certain preferred embodiments and exemplifications, it is not intended to limit the scope of the invention thereby, but solely by the claims appended hereto.

We claim:

1. A method of treating a non-biodegradable alkylene carbonate process waste stream comprising:
   a. hydrolyzing the alkylene carbonate in an aqueous alkaline solution at an alkaline pH to form an aqueous alkaline solution of the corresponding alkylene glycol;
   b. acidfying the aqueous alkaline alkylene glycol solution to a pH of about 8 to 8.5; and
   c. aerating the acidified solution in activated sludge to reduce the biological oxygen demand thereof.

2. The method of claim 1 comprising hydrolyzing the alkylene carbonate in an aqueous alkaline solution at a alkaline pH above 12 to form an aqueous alkaline solution of the corresponding alkylene glycol.

3. The method of claim 1 comprising hydrolyzing the alkylene carbonate in an aqueous alkali metal hydroxide solution at a alkaline pH above 12 to form an aqueous alkaline solution of the corresponding alkylene glycol.

4. The method of claim 3 comprising hydrolyzing the alkylene carbonate in an aqueous sodium hydroxide solution at a alkaline pH above 12 to form an aqueous alkaline solution of the corresponding alkylene glycol.

5. The method of claim 1 comprising adding dilute sulfuric acid to the alkaline alkylene glycol solution to acidify the aqueous alkaline alkylene glycol solution to a pH of about 8 to 8.5.

6. The method of claim 1 comprising aerating the acidified solution long enough to reduce the biological oxygen demand by at least about 95%.

7. The method of claim 1 comprising aerating the acidified solution for at least about 48 hours to reduce the biological oxygen demand by at least about 95%.

8. The method of claim 1 wherein the alkylene carbonate is propylene carbonate and the corresponding alkylene glycol is propylene glycol.

9. A method of treating a process waste stream from a process producing a non-biodegradable propylene carbonate stream comprising:
   a. hydrolyzing the propylene carbonate in an aqueous sodium hydroxide solution at an alkaline pH above 12 to form an aqueous alkaline solution of propylene glycol;
   b. acidifying the aqueous alkaline propylene glycol solution to a pH of about 8 to 8.5 with dilute sulfuric acid; and
   c. aerating the acidified propylene glycol solution in activated sludge, thereby forming water and carbon dioxide, and reducing the biological oxygen demand of the propylene glycol.

* * * * *